United States Patent
Chitloor et al.

(10) Patent No.: US 11,829,630 B2
(45) Date of Patent: Nov. 28, 2023

(54) SYNTHETICALLY PROVIDING MULTIPLE TYPES OF GRANULAR DELETE OPERATIONS FOR A CLOUD-BASED OBJECT STORAGE

(71) Applicant: EMC IP Holding Company LLC, Hopkinton, MA (US)

(72) Inventors: Ravi Vijayakumar Chitloor, Bengaluru (IN); Sunil Yadav, Bangalore (IN); Shelesh Chopra, Bangalore (IN); Amarendra Behera, Bangalore (IN); PrabhatKumar Dubey, Huskuru (IN); Deependra Singh, Kanpur (IN); Jigar Bhanushali, Valsad (IN); Himanshu Arora, Bangalore (IN); Tushar Dethe, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/078,958

(22) Filed: Oct. 23, 2020

(65) Prior Publication Data
US 2022/0129183 A1 Apr. 28, 2022

(51) Int. Cl.
*G06F 3/06* (2006.01)

(52) U.S. Cl.
CPC ............ *G06F 3/0652* (2013.01); *G06F 3/067* (2013.01); *G06F 3/0619* (2013.01); *G06F 3/0653* (2013.01); *G06F 3/0659* (2013.01)

(58) Field of Classification Search
CPC .... G06F 3/0652; G06F 3/0619; G06F 3/0653; G06F 3/0659; G06F 3/067
See application file for complete search history.

(56) References Cited

U.S. PATENT DOCUMENTS

| | | | |
|---|---|---|---|
| 8,527,468 B1 * | 9/2013 | Crafford | G06F 16/93 707/662 |
| 2005/0216534 A1 * | 9/2005 | Ikezawa | G06F 16/181 |
| 2010/0094809 A1 * | 4/2010 | Consul | H04L 51/22 707/662 |
| 2011/0264704 A1 * | 10/2011 | Mehra | G06F 16/289 707/802 |
| 2018/0018129 A1 * | 1/2018 | Nikaido | G06F 11/3433 |
| 2021/0144432 A1 * | 5/2021 | Sharma | H04N 21/4335 |

* cited by examiner

*Primary Examiner* — Arpan P. Savla
*Assistant Examiner* — Eric T Loonan
(74) *Attorney, Agent, or Firm* — Dergosits & Noah LLP; Todd A. Noah

(57) ABSTRACT

Described is a system (and method) for providing multiple types of granular delete operations for a cloud-based object storage. The system may include a server that acts as an intermediary between a client device and an object storage that stores client data. The server may allow a client to perform a hard delete (or permanent) delete and a soft delete. The server may perform a specialized processing to synthetically create the soft delete feature using a permanent object delete operation provided by the object storage. The specialized processing may include manipulating retention periods associated with objects depending on whether the object is subject to a hard delete or a soft delete. As a result, the server may provide the ability for clients to perform a soft delete at an object level using existing storage level APIs that do not directly support such a feature.

20 Claims, 5 Drawing Sheets

| Bucket ID | Object ID | Retention Period | Marked for Deletion |
|---|---|---|---|
| 3231 | 5321 | 2001-03-15T05:00:00 | No |
| 3231 | 5322 | 2001-04-15T05:00:00 | Yes |
| 3231 | 5323 | 2001-05-15T05:00:00 | No |
| 3544 | 6432 | ... | Yes |
| 3877 | 7555 | ... | No |
| ... | ... | ... | ... |

Object Catalog 160

FIG. 3

SYNTHETICALLY PROVIDING MULTIPLE TYPES OF GRANULAR DELETE OPERATIONS FOR A CLOUD-BASED OBJECT STORAGE

TECHNICAL FIELD

This disclosure relates to cloud-based storage systems, and more particularly, providing multiple types of delete operations using a cloud-based component to manage data on an object storage.

BACKGROUND

Cloud-based storage systems (or on-demand storage systems) may provide various tools that are crucial for enterprise level network clients. For example, clients may rely on such systems for data protection and recovery services that efficiently back up and recover data in the event of data loss to allow business applications to remain in service or quickly come back up to service. Clients may rely on such cloud-based storages to leverage the benefits associated with such on-demand systems such as cost efficiency and scalability. These cloud-based systems may implement an object-based storage architecture, and accordingly, client data such as backup data may be stored as objects (or data objects). To interact with these cloud-based storages, clients may access a storage interface such as an application programming interface (API) provided by the cloud-based storage system. For example, these APIs may provide the ability for a client to perform various data operations on client backup data. However, these storage layer APIs may be limited in functionality and not optimized for various backup-related service tools. For example, a backup service that works in conjunction with the cloud-based storage may implement various applications (or tools) for with data retention and recovery features that may not be fully supported by the storage APIs. For example, the storage API may provide versioning tools for data retention, but these tools may only be provided at a bucket or container level, and not at a more granular object level. Thus, there is a continued need to provide tools tailored for backup-related operations on an object storage to efficiently manage client backup data.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

FIG. 3 is a block diagram illustrating a configuration of an object catalog according to one or more embodiments of the disclosure.

DETAILED DESCRIPTION

Figure 1:
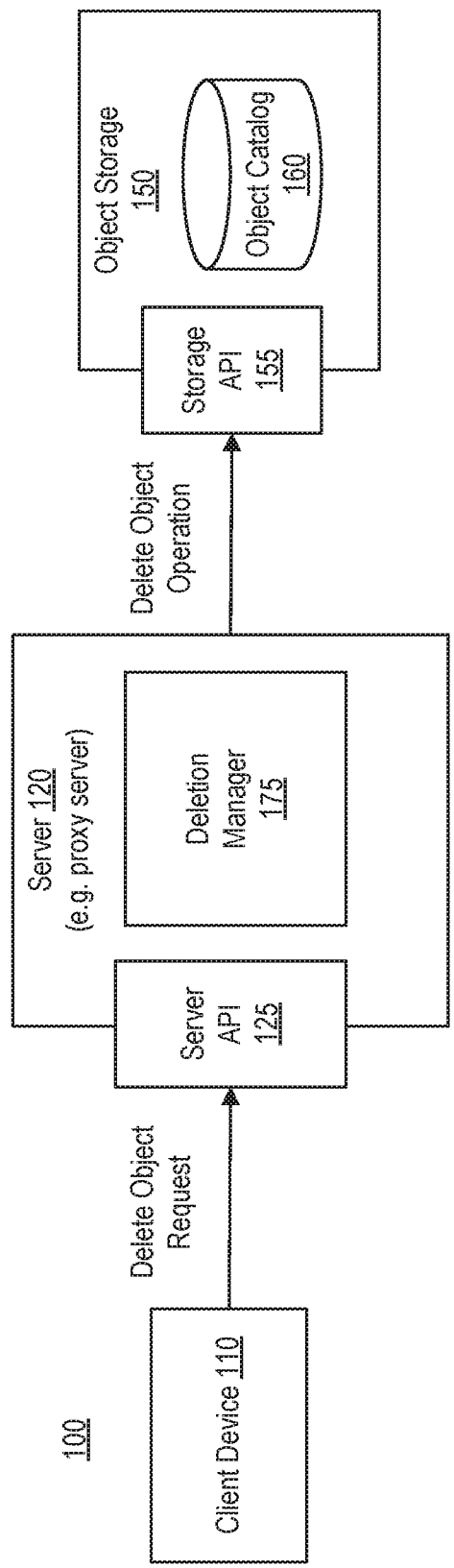
FIG. 1 is a block diagram illustrating an example of an operating environment that may be used in conjunction with one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for providing multiple types of granular delete operations for a cloud-based object storage. The system may include a server that acts as an intermediary between a client device and an object storage that stores client data (e.g. backup data). For example, requests by a client device to delete data stored on the object storage may be routed through the server. The server may provide multiple types of delete operations that a client may request for managing client backup data. These delete operations may include a hard delete (or permanent) delete and a soft delete. The hard (or standard, forced, etc.) delete may permanently delete the data from the object storage. The soft delete may render the data as unusable without permanently deleting the data from the object storage. For example, a soft delete may correspond to data being moved to a recycle bin. As part of a soft delete request, a retention period may be specified after which point the data may be permanently deleted from the object storage. In response to receiving a particular type of delete request, the server may execute a delete operation directly on the object storage. However, the object storage (e.g. storage level API) may not directly provide an operation to perform a soft delete at the object level. For example, the object storage may only provide a standard (or permanent) delete operation for deleting a particular object. Accordingly, the server may perform a specialized processing to synthetically create the soft delete feature using the standard (e.g. only) object delete operation provided by the object storage. For example, the server may perform the specialized processing at an application level and perform both hard and soft deletes using the same object delete operation provided by a storage level API. The specialized processing may leverage an object catalog that stores object information. For example, the server may manipulate retention period information associated with an object in a specific manner depending on whether the object is subject to a hard delete or a soft delete. As a result, the server may provide the ability for clients to perform a soft delete operation for particular objects using existing storage level APIs of an object storage provider.

As referred to herein, a hard delete (or forced delete) may include permanently removing data from the object storage such that it is not recoverable. In some embodiments, the hard delete may correspond to a standard (or default, regular, normal, etc.) type of delete operation. A soft delete may include removing data such that it is typically unusable to a user. For example, soft deleted data may be marked as unusable without permanently deleting (or erasing, removing, overwriting, etc.) the data from the storage. In other words, soft deleted data may be recoverable, for example, by initiating a recovery process. As an example use case for a soft delete, a user (e.g. backup administrator) wanting to view only the most relevant backup data (e.g. the most recent backups), may perform a soft delete on less relevant backup data (e.g. older backups). As a result, the less relevant backup data may not appear as part of a current backup listing (e.g. decluttered listing) within a backup tool. However, such backup data may still be recoverable, for example, as part of a disaster recovery scenario.

Accordingly, the system may provide the ability to perform either a hard delete or a soft delete to efficiently manage backup data stored on an object storage in conjunction with various backup management tools.

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes data protection and backup services. For example, at least some functionality may be provided by, or implemented in connection with, various platforms such as the Data Domain™ data protection platform provided by Dell EMC Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components (or devices) such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique, infrastructure, or hardware (e.g. Solid State Drive (SSD), Hard Disk Drive (HDD)), which may include storage systems provided by a cloud service provider.

More specifically, and with reference to FIG. 1, shown is a block diagram illustrating an example of an operating environment 100 for performing multiple types of delete operations on an object storage according to one or more embodiments of the disclosure. It should be noted that the components of operating environment 100 may interact via a network, which may be any type of wired or wireless network including a local area network (LAN), a wide area network (WAN), or a direct communication link, or other suitable connection.

As shown, the environment 100 may include a client device 110, a server (e.g. a cloud-based component/gateway and/or a proxy server) 120, and a cloud-based (or on-demand) object storage 150. In general, the server 120 may act as an intermediary between the client device 110 and the object storage 150. In some embodiments, the client device 110 may be associated with a client that is a customer (or subscriber, client, tenant, user, account, etc.) of a backup service or platform (e.g. software/platform-as-a-service) provided by a first entity, as well as a customer of an object storage (or platform) provided by a different (or second) entity. For example, the server 120 may be provided as part of the backup service provided the first entity (e.g. Dell EMC), and the object storage 150 may be provided as part of an object storage service provided by the different entity (e.g. service such as Amazon S3, Microsoft Azure, IBM Cloud Object Storage, Google Cloud Storage, etc.). In some embodiments, the first entity providing the backup service may also provide (or host) the client device 110 (e.g. as part of a VM).

The client device (or client system) 110 may be associated with data (e.g. one or more files, directories, objects, etc.) that is backed up to the object storage 150. The object storage (or object storage system) 150 may include a persistent object storage that implements a storage architecture that manages data as objects. For example, each object stored by the object storage 150 may include data, metadata, and/or a globally unique identifier for the object. The client device 110 may use the server 120 as an intermediary for managing client backup data stored on the object storage 150. For example, the server 120 may provide enhanced security by being a single secure point of access to data stored externally on the object storage 150. For example, a client device 110 may implement certain a network configuration (e.g. firewall) that limits external access to the client environment. Such a network configuration may be customized to authorize external access to the client device 110 only by the server 120 and not the object storage 150 directly. In addition, the server 120 may also allow the client device 110 to offload resource intensive data management processing.

For example, the server 120 may handle backup-related data processing before storing data into the object storage 150. Accordingly, the server 120 may provide advantages over traditional proxy servers that merely forward data to the object storage 150. In addition, the server 120 may be an application or hardware component remote from the client device 110, and may be provided as part of a cloud-based backup service platform. Accordingly, the server 120 may be scalable such that it may perform data operations in parallel for multiple client devices 110 and for multiple object storages 150.

As described, the server 120 may act as an intermediary for communications between the client device 110 and an object storage 150. For example, these communications may include requests by the client device 110 to perform data operations on the object storage 150, which are routed and scheduled by the server 120. For example, as shown, the client device 110 may provide (or send, transmit, etc.) a delete object request to the server 120 using a server API 125. As shown, the server 120 may then initiate (or perform, execute, etc.) a corresponding delete operation directly on the object storage using the storage API 155. As further described herein, the server 120 may perform the object delete immediately (or substantially immediately) for a hard delete request, or after a retention period for a soft delete request. In some embodiments, the server API 125 may be a REST API that includes a common set of operations that correspond to various data-related operations on the object storage 150. For example, the server API 125 may include operations allowing a client device 110 to perform a hard delete operation and a soft delete operation. The server API 125 may also allow the client device 110 to read data from an object storage 150, write data to an object storage 150, copy data within the object storage 150, and various other operations for managing data. The same set of operations provided by the server API 125 may be used by the client device 110 irrespective of the type of object storage 150. To provide such object-storage-agnostic functionality, the server 120 may include a function library that includes object-storage-specific functions. Accordingly, the server 120 may use such object-storage-specific functions to interact directly with the object storage 150. For example, the server 120 may initiate data operations directly on the object storage 150 by calling various methods (functions, operations, etc.) of the storage API 155. In some embodiments, the storage API 155 may include only a standard delete operation (e.g. delete object operation) to delete particular objects. Accordingly, the server 120 may implement the soft delete feature in a synthetic manner as further described herein. Despite the potentially different types of client devices 110 and object storages 150, all of the data may be managed through the same server 120. For example, client devices 110 associated with different customers of an object storage 150 (or object storage service) may use the same proxy server API 125. Accordingly, the configuration of the server 120 may allow customers (or clients) of a backup service to efficiently and seamlessly interact with the different cloud-based services providers (or entities) when managing backup data.

As described, the server 120 may provide multiple types of delete operations to be performed on the object storage 150. Accordingly, the server 120 may include a deletion manager 175. The deletion manager (or manager) 175 may coordinate (or manage, orchestrate, execute, automate, etc.) the initiation (or execution) of delete operations on the object storage 150. In some embodiments, the deletion manager 175 may provide a user interface that allows a user to perform and configure various settings associated with deleting data. For example, the user interface may allow a user to input various settings such as a default retention period for a soft deletes. In addition, the deletion manager 175 may direct (or control, initiate, etc.) other components of the operating environment 100 to perform various processes as further described herein.

To provide the delete functionality, the server 120 (e.g. deletion manager 175) may interact with an object catalog 160. The object catalog (or database, table, index, etc.) 160 may store information (or metadata) associated with objects stored by the object storage 150. The object catalog 160 may be maintained by the server 120 and/or the object storage 150. The object catalog 160 may reside on the object storage 150, although it may also reside on the server 120, or on another component (e.g. cloud-based component) that is accessible by the server 120 and/or object storage 150. The object catalog 160 may be updated by the server 120 as part of a process to provide the delete functionality. For example, the server 120 may update the object catalog 160 residing on the object storage 150 by accessing the storage API 155.

Accordingly, the server 120 may perform multiple types of delete operations on the object storage 150 by leveraging the object catalog 160. A process for performing the multiple types of delete operations and an example configuration of the object catalog 160 are further described with reference to FIGS. 2 and 3.

Figure 2:
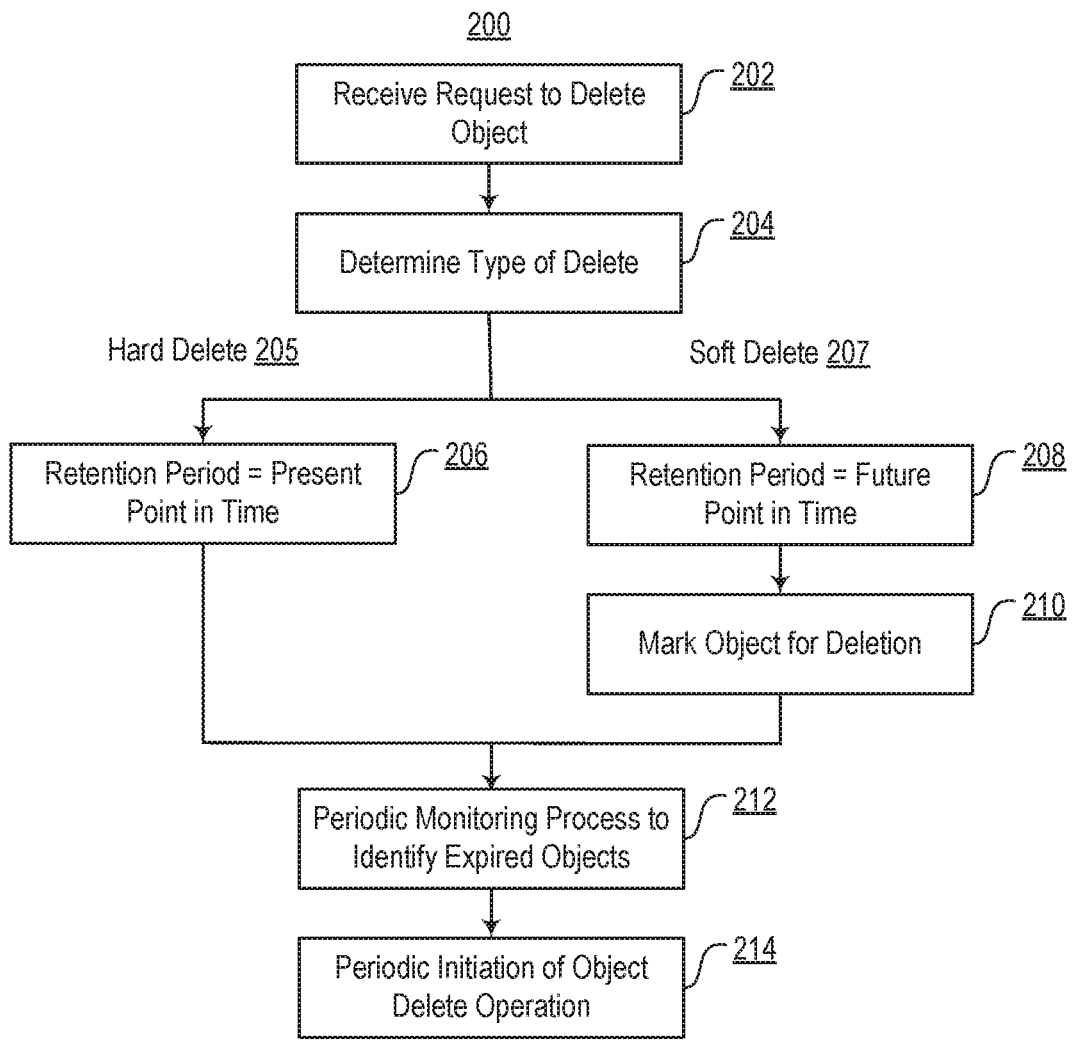
FIG. 2 is a flow diagram illustrating a process for providing multiple types of delete operations according to one or more embodiments of the disclosure.

FIG. 2 is a flow diagram illustrating a process 200 for providing multiple types of delete operations according to one or more embodiments of the disclosure. Process 200 may use processing logic, which may include software, hardware, or a combination thereof. For example, process 200 may be performed by a system including one or more components described in operating environment 100 (e.g. server 120).

As shown, in 202, the system (e.g. server 120) may receive a request to delete an object. In 204, the system may determine the type of delete requested. For example, the system may determine the particular type of based on attributes of the request. For example, the request may be provided via a particular API operation (e.g. provided by the server API 125) that directly indicates the requested type of delete. For instance, a hard delete request may be provided using a delete (or default delete, regular delete, standard delete, etc.) method, and a soft delete request may be provided using a soft delete method. In some embodiments, the system may also infer the type of delete based on attributes associated with the request. For example, the request may indicate a retention period associated with the object to be deleted, and accordingly, the system may infer that the intended type of delete is a soft delete.

If the system determines the request is for a hard delete (e.g. branch 205), in 206, the system may update a retention period associated with the object to be deleted to a present point in time (or point-in-time). The retention period may be stored as part of an object catalog (e.g. object catalog 160). In some embodiments, the present point in time may include a current point in time, a previous point in time, or a near future point in time such that the object will be immediately (or near immediately) identified as expired (e.g. within seconds or minutes).

However, if the system determines the request is for a soft delete (e.g. branch 207), in 208, the system may update a retention period associated with the object to be deleted to a future point in time (or point-in-time), after which, the object will be permanently deleted. The future point in time (e.g. the retention period) may be provided as part of the request, or may be set as a default period by the system (e.g. 30 days).

In addition, as part of a soft delete processing, in 210, the system may mark to object for deletion. For example, the system may update a field associated with the object to be deleted to indicate the object is marked for deletion. When an object is marked for deletion, the object may not be usable. For example, an object marked for deletion may not be included within a current listing of objects stored on the object storage. For example, as described, a user (e.g. backup administrator) may want to view only the most relevant backup data (e.g. the most recent backups), and accordingly, may perform a soft delete on less relevant backup data (e.g. older backups). As a result of the soft deleted data being marked for deletion, the less relevant backup data may not appear as part of a current backup listing shown within an interface of a backup tool. However, such backup data may still be recoverable, for example, after initiating a disaster recovery process.

In 212, the system may run a periodic monitoring process that identifies expired objects. For example, the monitoring process may run (or execute) according to a schedule (e.g. hourly) and identify objects that are associated with a retention period that has expired. In some embodiments, the system may parse (or scan, analyze, etc.) the object catalog to identify objects that have expired. In some embodiments, the monitoring process may run (or execute) periodically based on a predetermined schedule, or may run in response to certain criteria. For example, the criteria may include detecting an update to one or more retention periods stored by an object catalog.

As described, a retention period for a particular object to be deleted may be updated based on whether the object is subject to a hard delete or a soft delete. For example, after the retention period for an object subject to a hard delete is updated to the present point in time (e.g. block 206), the monitoring process (e.g. block 212) may identify the object during the next monitoring iteration (or pass, execution, etc.). For example, the present point in time may include a range of a few seconds (or minutes) within the time of the request (e.g. a few seconds before or after the point in time the request is received). In other words, when an object is subject to a hard delete, the retention period may be updated such that the object will expire substantially immediately (e.g. within seconds, minutes, or hours). For example, the retention period may be deemed as expired during the next iteration of the monitoring process.

However, after the retention period for an object subjected to a soft delete is updated to a future point in time (e.g. block 208), the monitoring process (e.g. block 212) may identify the object as expired after the prolonged (e.g. specified) retention period (e.g. after a number days or months). For example, the retention period will be deemed as expired during an iteration of the monitoring process that occurs after the future point in time (e.g. 30 days).

In 214, the system may periodically initiate an object delete operation to permanently delete the objects identified as expired. For example, the identified objects may be stored as part of an expired objects list, or via a field (e.g. expired objects) within the object catalog. In some embodiments, the server may use an object delete operation provided by the object storage, for example, as part of a storage API. Accordingly, in some embodiments, the same object delete operation (e.g. delete operation API) may be used to delete data irrespective of whether it was initially subject to a hard delete or a soft delete. In other words, using process 200, the server may synthetically create the soft delete (and hard delete) as part of an application layer logic that leverages the storage layer logic (e.g. storage API). Thus, the server may abstract the object-level soft delete processing from the object storage.

As described, the server may leverage the object catalog to provide multiple types of delete operations. An example of such an object catalog is further described with reference to FIG. 3.

FIG. 3 is a block diagram 300 illustrating an example configuration of an object catalog according to one or more embodiments of the disclosure.

As shown, the object catalog 160 may include various fields. It should be noted that the fields included in this example are simplified for discussion purposes, and that an object catalog 160 implemented by the server (e.g. server 120) or object storage (e.g. object storage 150) may include numerous other fields to manage objects. Referring to object catalog 160, each entry 310 (entries 310A-E) may correspond to a particular object stored by the object storage. As shown, for each of the entries 310A-E, the object catalog 160 may include a bucket identifier (ID) 320, an object identifier 330, a retention period 340, and marked for deletion field 350. The bucket identifier (ID) 320 may indicate the bucket (or container) to which an object belongs. The object identifier (ID) 330 may uniquely identify a particular object. The retention period 340 may indicate the period of time for which an object subject to deletion is to be retained. The marked for deletion field 350 may indicate whether an object has been marked for deletion, for example, in response to being soft deleted.

As shown, the object catalog 160 may include a set of entries 310 each corresponding to an object. For example, entry 310A may correspond to an object subject to a hard delete. Accordingly, in response to being subject to a hard delete, the retention period 340 may be updated to a present, past, or near future point in time. For instance, the request to perform a hard delete for the corresponding object (e.g. object ID 5321) may have been received at 5 pm on Mar. 15, 2001 (or 2001-03-15T05:00:00). Accordingly, as shown, the retention period 340 may be updated to 2001-03-15T05:00:00, which would be a present point in time such that the object would be identified as expired immediately after the delete request. It should be noted that the retention time may also be updated to a previous (or past) point in time (e.g. 2001-03-15T04:59:00, i.e. 1 minute before the request), or a near future point in time (e.g. 2001-03-15T05:01:00, i.e. 1 minute after the request). Accordingly, a present point of time may include a point in time such that the object would be not retained for any significant period of time by the object storage.

Entries 310B and 310D may correspond to objects subject to a soft delete. Accordingly, in response to being subject to a soft delete, the retention period 340 for each of these objects may be updated to a future point in time. For instance, with respect to entry 310B, the request to perform a soft delete for the corresponding object (e.g. object ID 5322) may have also been received at 5 pm on Mar. 15, 2001 (or 2001-03-15T05:00:00). Because the request was for a soft delete, the request may also specify a future point in time (e.g. 1 month in this example) as the retention period. Accordingly, as shown, the retention period 340 may be updated to 2001-04-15T05:00:00, which would mean the object would not be deleted from the object storage until after the expiration of Apr. 15, 2001. Similarly, the object (e.g. object ID 6432) corresponding to entry 310D would be deleted after the expiration of May 15, 2001 (e.g. 2 month retention period). In addition, because the objects corresponding to entries 310B and 310D are subject to a soft delete, the marked for deletion field 350 for each entry may indicate "Yes" (or true). Entries 310C and 310E correspond to objects not subject to a delete request, and accordingly, are not associated with a retention period and are not marked for deletion.

Accordingly, the system may manipulate the object catalog 160 to provide multiple the multiple types of delete operations.

Figure 4:
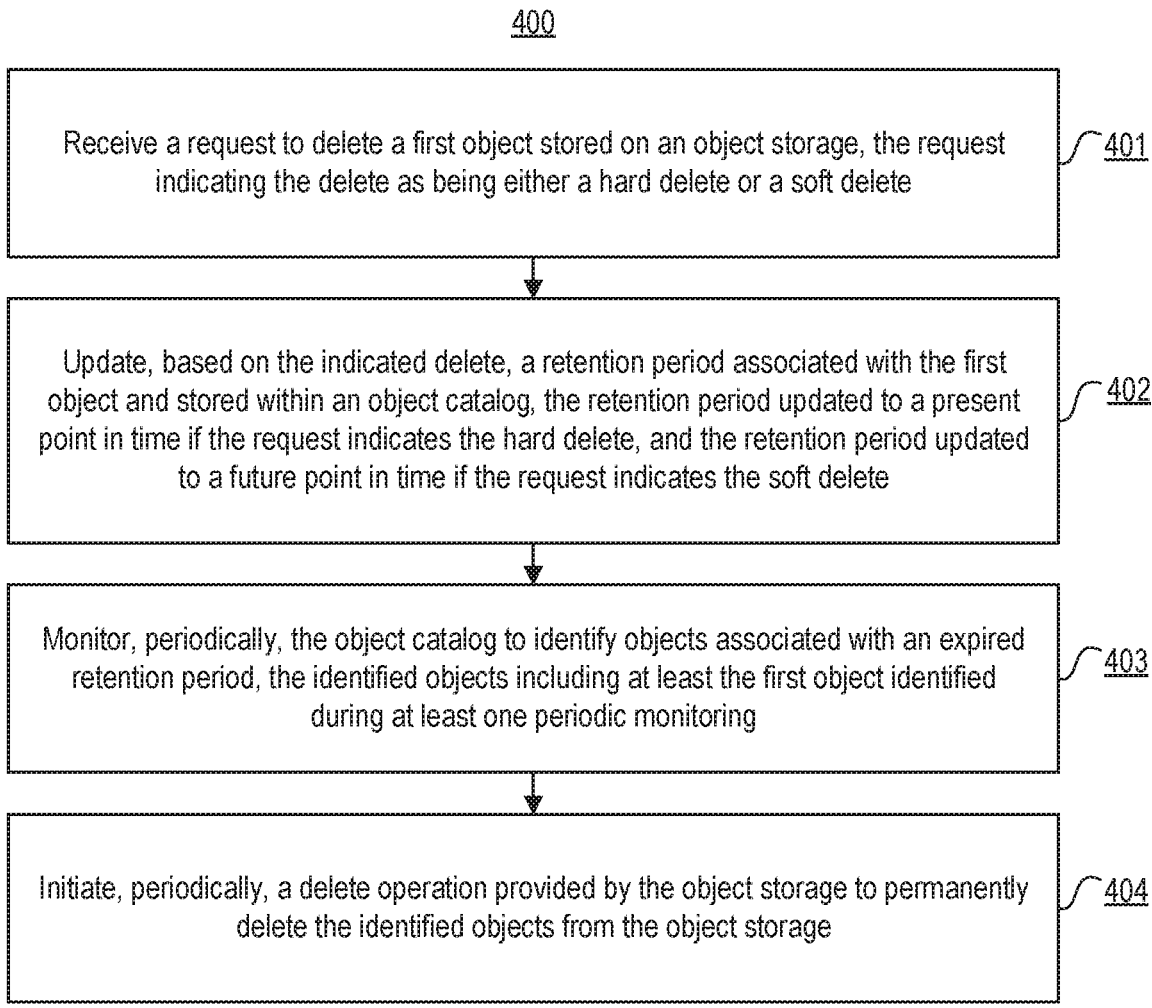
FIG. 4 is a flow diagram illustrating an example method of providing multiple types of delete operations according to one or more embodiments of the disclosure.

FIG. 4 is a flow diagram illustrating an example method of providing multiple types of delete operations according to one or more embodiments of the disclosure. Process 400 may use processing logic, which may include software, hardware, or a combination thereof. For example, process 400 may be performed by a system including one or more components described in operating environment 100 (e.g. server 120, deletion manager 175, etc.).

In 401, the system may receive, from a client device (e.g. client device 110), a request to delete a first object stored on an object storage (e.g. object storage 150). The request may indicate the delete as being either a hard delete or a soft delete. As described, the system may determine the type of delete operation. For example, the server may provide different methods as part of the server API (e.g. server API 125), and depending on which method the client uses (or calls), the server may directly determine which type of delete to employ. For example, the client may use a standard delete method for hard deletes, and use a soft delete method for soft deletes. As described, the server API (e.g. application level API) may be REST API, and accordingly, the request and related information such as the retention period may be submitted in a manner compatible with a REST API (e.g. as part of a JSON file). In some embodiments, the system may also infer the type of delete based on attributes associated with the request. For example, a standard delete request may be interpreted as a hard delete request. In other words, the hard delete may be a default type of delete request. In some embodiments, when the request specifies a retention period, the server may interpret the request as a soft delete request.

In 402, the system may update a retention period associated with the first object. In some embodiments, the retention period may be stored within an object catalog (e.g. object catalog 160) associated with the object storage. The type of update may be based on the indicated delete. The retention period may be updated to a present point in time if the request indicates the hard delete. Alternatively, the retention period may be updated to a future point in time if the request indicates the soft delete.

In 403, the system may periodically monitor the object catalog to identify objects associated with an expired retention period. The identified objects may include at least the first object identified during at least one periodic monitoring. For example, if the first object is subject to a hard delete, the first object may be identified during a monitoring (monitoring pass) that occurs after (or immediately after) receiving the delete request. In other words, the at least one periodic monitoring may include the monitoring immediately after the request to delete a first object.

However, if the first object is subject to a soft delete, the first object may be identified during a monitoring pass that occurs after the retention period for first object expires.

In some embodiments, if the request to delete the first object indicates the soft delete, the server may update the object catalog to indicate the first object is marked for deletion. In some embodiments, the system may receive, from the client device, request to obtain a list objects stored on the object storage. In response, the system may provide the list of objects stored on the object storage. However, the list may not include the first object based on the object catalog indicating the first object is marked for deletion.

In some embodiments, if the request indicates the soft delete, the request may include the future point in time as a value for the retention period for the first object. For example, the soft delete may be indicated based on the request being received via a soft delete method of the server API. In some embodiments, the soft delete method may be configured to receive the value for the retention period.

In some embodiments, the system may restore (or recover) an object subject to a soft delete. For example, in response to a request by the client device to restore the first object, the system may update the object catalog to indicate the first object is not marked for deletion. As a result, the first object may be usable (or visible) to the user.

In 404, the system may periodically initiate a delete operation provided by the object storage to permanently delete the identified objects from the object storage. In some embodiments, the delete operation provided by the object storage may be the only object-level delete operation provided by the object storage. In some embodiments, initiating the delete operation may include accessing a delete method of a storage API (e.g. storage API 155) provided by the object storage. For example, the delete method may be configured to permanently delete the identified objects irrespective of whether a particular identified object is associated with the hard delete or the soft delete.

It should be noted that, in some embodiments, the monitoring process and/or the deletion process may be executed by the object storage, for example, as part of a garbage collection or garbage-collection-type process. Accordingly, in such embodiments, the server may work in conjunction with the object storage to perform such processes.

Figure 5:
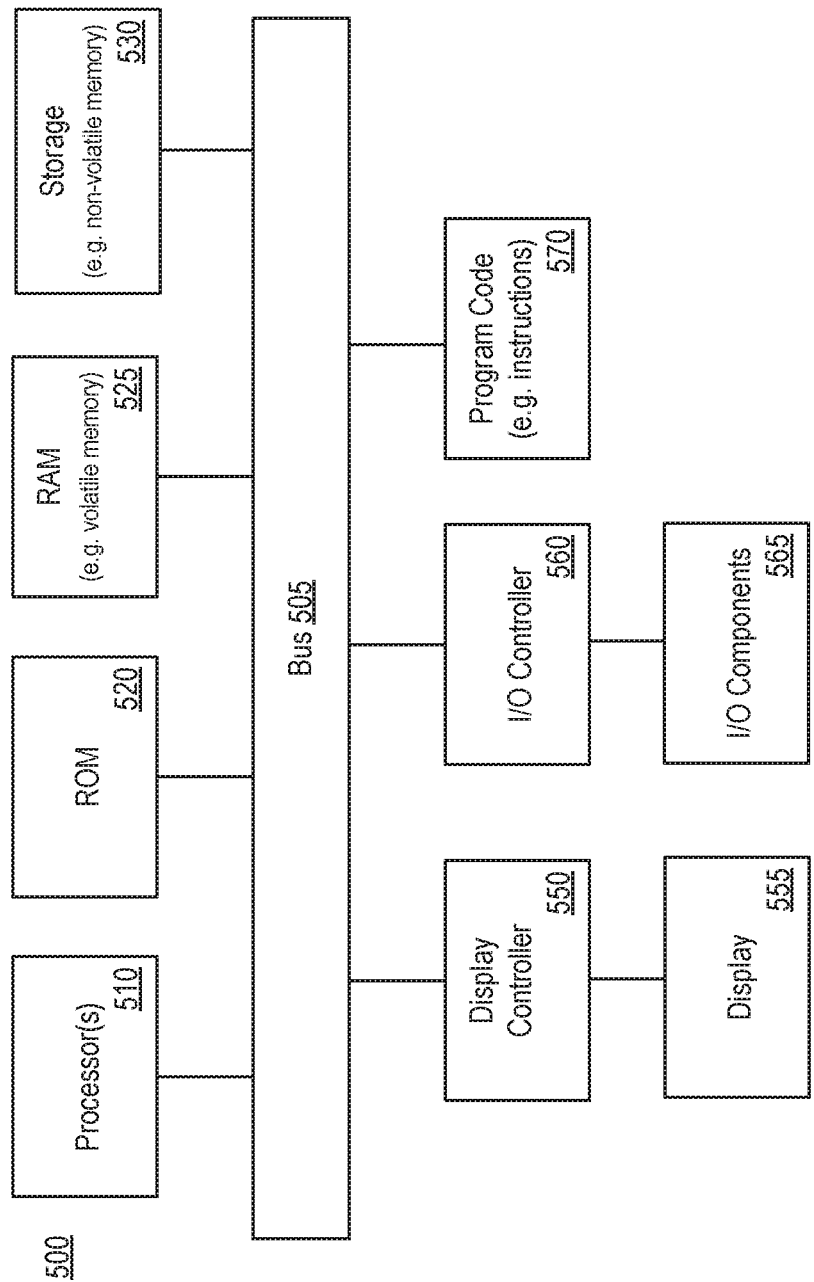
FIG. 5 is a block diagram illustrating an example of a computing system that may be used in conjunction with one or more embodiments of the disclosure.

FIG. 5 shows a block diagram of an example of a computing system that may be used in conjunction with one or more embodiments of the disclosure. For example, computing system 500 (or system, or server, or computing device, or device) may represent any of the devices or systems (e.g. server 120, client device 110, object storage 150, etc.) described herein that perform any of the processes, operations, or methods of the disclosure. Note that while the computing system 500 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 500 may include a bus 505 which may be coupled to a processor 510, ROM (Read Only Memory) 520, RAM (or volatile memory) 525, and storage (or non-volatile memory) 530. The processor(s) 510 may retrieve stored instructions from one or more of the memories 520, 525, and 530 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 510 may perform operations in an on-demand or "cloud computing" environment or as a service (e.g. within a "software as a service" (SaaS) implementation). Accordingly, the performance of operations may be distributed among the one or more processors 510, whether residing only within a single machine or deployed across a number of machines. For example, the one or more processors 510 may be located in a single geographic location (e.g. within a home environment, an office environment, or a server farm), or may be distributed across a number of geographic locations. The RAM 525 may be implemented as, for example, dynamic RAM (DRAM), or other types of memory that require power continually in order to refresh or maintain the data in the memory. Storage 530 may include, for example, magnetic, semiconductor, tape, optical, removable, non-removable, and other types of storage that maintain data even after power is removed from the system. It should be appreciated that storage 530 may be remote from the system (e.g. accessible via a network).

A display controller 550 may be coupled to the bus 505 in order to receive display data to be displayed on a display device 555, which can display any one of the user interface features or embodiments described herein and may be a local or a remote display device. The computing system 500 may also include one or more input/output (I/O) components 565 including mice, keyboards, touch screen, network interfaces, printers, speakers, and other devices. Typically, the input/output components 565 are coupled to the system through an input/output controller 560.

Program code 570 may represent any of the instructions, applications, software, libraries, toolkits, modules, components, engines, units, functions, logic, etc. as described herein (e.g. server 120, deletion manager 175, etc.). Program code 570 may reside, completely or at least partially, within the memories described herein (e.g. non-transitory computer-readable media), or within a processor during execution thereof by the computing system. Program code 570 may include both machine code, such as produced by a compiler, and files containing higher-level or intermediate code that may be executed by a computing system or other data processing apparatus (or machine) using an interpreter. In addition, program code 570 can be implemented as software, firmware, or functional circuitry within the computing system, or as combinations thereof. Program code 570 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
one or more processors; and
a non-transitory computer-readable medium storing a plurality of instructions, which when executed, cause the one or more processors to:
receive, via a server application programming interface (API) at a server, a request to delete an object stored on an object storage using a one of a plurality of API methods from a client device, the request indicating a type of delete as being either a hard delete or a soft delete;
determine, by the server, whether the type of delete in the request is a hard delete or a soft delete based on the API method used;
update, by the server and based on the indicated delete, a retention period field value for a retention period associated with the object and stored within an object catalog based on the determination of the type of delete in the request, the retention period field value updated to a present point in time so the object will be identified and deleted if the request indicates the hard delete, and the retention period field value updated to a future point in time if the request indicates the soft delete, the object catalog being a data structure comprising fields associated with objects stored on the object storage, a retention period field being one of a plurality of fields within the object catalog, where each object referenced in the object catalog has a value associated with the retention period field;
monitor, periodically by the server, the object catalog, to identify objects associated with an expired value in the retention period field, the identified objects including at least the object identified during at least one periodic monitoring; and
initiate, periodically by the server, a standard delete operation provided by a storage API at the object storage to permanently delete the identified objects from the object storage after a corresponding expired retention period.

2. The system of claim 1, wherein the plurality of instructions, when executed, further cause the one or more processors to:

update, by the server and if the request to delete the object indicates the soft delete, the object catalog to indicate the object is marked for deletion.

3. The system of claim 2, wherein the plurality of instructions, when executed, further cause the one or more processors to:
receive, by the server and from the client device, a request to obtain a list of objects stored on the object storage; and
provide, by the server, the list of objects stored on the object storage, the list not including the object based on the object catalog indicating the object is marked for deletion.

4. The system of claim 1, wherein if the request indicates the soft delete, the request includes the future point in time as a value for the retention period field within the object catalog for the object.

5. The system of claim 4, wherein the soft delete is indicated based on the request being received via a soft delete method of the server API provided by the server, the soft delete method configured to receive the value for the retention period field within the object catalog.

6. The system of claim 1, wherein initiating the standard delete operation includes accessing a delete method of the storage API provided by the object storage, the delete method configured to permanently delete the identified objects irrespective of whether a particular identified object is associated with the hard delete or the soft delete.

7. The system of claim 1, wherein the delete operation provided by the object storage is an only object-level delete operation provided by the object storage.

8. The system of claim 1, wherein the at least one periodic monitoring includes monitoring the object catalog immediately after receiving the request to delete the object.

9. A method comprising:
receiving, via a server application programming interface (API) at a server, a request to delete an object stored on an object storage using a one of a plurality of API methods from a client device, the request indicating a type of delete as being either a hard delete or a soft delete;
determining, at the server, whether the type of delete in the request is a hard delete or a soft delete based on the API method used;
updating, by the server and based on the indicated delete, a retention period field value for a retention period associated with the object and stored within an object catalog based on the determination of the type of delete in the request, the retention period field value updated to a present point in time so the object will be identified and deleted if the request indicates the hard delete, and the retention period field value updated to a future point in time if the request indicates the soft delete, the object catalog being a data structure comprising fields associated with objects stored on the object storage, a retention period field being one of a plurality of fields within the object catalog, where each object referenced in the object catalog has a value associated with the retention period field;
monitoring, periodically by the server, the object catalog, identify objects associated with an expired value in the retention period field, the identified objects including at least the object identified during at least one periodic monitoring; and
initiating, periodically by the server, a standard delete operation provided by a storage API at the object storage to permanently delete the identified objects from the object storage after a corresponding expired retention period.

10. The method of claim 9, further comprising:
updating, by the server and if the request to delete the object indicates the soft delete, the object catalog to indicate the object is marked for deletion.

11. The method of claim 10, further comprising:
receiving, by the server and from the client device, a request to obtain a list of objects stored on the object storage; and
providing, by the server, the list of objects stored on the object storage, the list not including the object based on the object catalog indicating the object is marked for deletion.

12. The method of claim 9, wherein if the request indicates the soft delete, the request includes the future point in time as a value for the retention period field within the object catalog for the object.

13. The method of claim 12, wherein the soft delete is indicated based on the request being received via a soft delete method of the server API provided by the server, the soft delete method configured to receive the value for the retention period field within the object catalog.

14. The method of claim 9, wherein initiating the delete operation includes accessing a delete method of the storage API provided by the object storage, the delete method configured to permanently delete the identified objects irrespective of whether a particular identified object is associated with the hard delete or the soft delete.

15. A computer program product comprising a non-transitory computer-readable medium having a computer-readable program code embodied therein to be executed by one or more processors, the program code including instructions to:
receive, via a server application programming interface (API) at a server, a request to delete an object stored on an object storage using a one of a plurality of API methods from a client device, the request indicating a type of the delete as being either a hard delete or a soft delete;
determine, by the server, whether the type of delete in the request is a hard delete or a soft delete based on the API method used;
update, by the server and based on the indicated delete, a retention period field value for a retention period associated with the object and stored within an object catalog based on the determination of the type of delete in the request, the retention period field value updated to a present point in time so the object will be identified and deleted if the request indicates the hard delete, and the retention period field value updated to a future point in time if the request indicates the soft delete, the object catalog being a data structure comprising fields associated with objects stored on the object storage, a retention period field being one of a plurality of fields within the object catalog, where each object referenced in the object catalog has a value associated with the retention period field;
monitor, periodically by the server, the object catalog, to identify objects associated with an expired value in the retention period field, the identified objects including at least the object identified during at least one periodic monitoring; and
initiate, periodically by the server, a standard delete operation provided by a storage API at the object storage to permanently delete the identified objects from the object storage after a corresponding expired retention period.

16. The computer program product of claim 15, wherein the program code includes further instructions to:
update, by the server and if the request to delete the object indicates the soft delete, the object catalog to indicate the object is marked for deletion.

17. The computer program product of claim 16, wherein the program code includes further instructions to:
receive, by the server and from the client device, a request to obtain a list of objects stored on the object storage; and
provide, by the server, the list of objects stored on the object storage, the list not including the object based on the object catalog indicating the object is marked for deletion.

18. The computer program product of claim 15, wherein if the request indicates the soft delete, the request includes the future point in time as a value for the retention period field within the object catalog for the object.

19. The computer program product of claim 18, wherein the soft delete is indicated based on the request being received via a soft delete method of the server API provided by the server, the soft delete method configured to receive the value for the retention period field within the object catalog.

20. The computer program product of claim 15, wherein initiating the delete operation includes accessing a delete method of the storage API provided by the object storage, the delete method configured to permanently delete the identified objects irrespective of whether a particular identified object is associated with the hard delete or the soft delete.

* * * * *